US011267126B2

(12) United States Patent
Asano et al.

(10) Patent No.: US 11,267,126 B2
(45) Date of Patent: Mar. 8, 2022

(54) ROBOT HAND, ROBOT APPARATUS, AND CONTROL METHOD FOR ROBOT HAND

(71) Applicant: CANON KABUSHIKI KAISHA, Tokyo (JP)

(72) Inventors: Hidetada Asano, Yokohama (JP); Shuuichi Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 415 days.

(21) Appl. No.: 15/978,910

(22) Filed: May 14, 2018

(65) Prior Publication Data
US 2018/0333858 A1 Nov. 22, 2018

(30) Foreign Application Priority Data

May 18, 2017 (JP) .............................. JP2017-098718

(51) Int. Cl.
*B25J 9/16* (2006.01)
*B25J 15/08* (2006.01)
(Continued)

(52) U.S. Cl.
CPC ........... *B25J 9/1694* (2013.01); *B25J 9/1612* (2013.01); *B25J 13/082* (2013.01);
(Continued)

(58) Field of Classification Search
CPC ........ B25J 9/1612; B25J 15/10; B25J 13/082; B25J 15/0009; B25J 9/1694;
(Continued)

(56) References Cited

U.S. PATENT DOCUMENTS 4,620,436 A * 11/1986 Hirabayashi .......... G01L 5/1627
73/1.15
4,791,588 A * 12/1988 Onda ................... G05B 19/423
700/260

(Continued)

FOREIGN PATENT DOCUMENTS

CN        1757490 A     4/2006
CN      100417499 C     9/2008
(Continued)

OTHER PUBLICATIONS

Lael U. Odhner, Leif P. Jentoft, Mark R. Claffee, Nicholas Corson, Yaroslav Tenzer, Raymond R. Ma, Martin Buehler, Robert Kohout, Robert D. Howe, Aaron M. Dollar; "A Compliant, Underactuated Hand for Robust Manipulation"—The International Journal of Robotics Research, 2014 vol. 33, No. 5, pp. 736-752 (downloaded from ijr.sagepub.com at European Patent Office on Jul. 29, 2016.

*Primary Examiner* — Stephen Holwerda
(74) *Attorney, Agent, or Firm* — Canon U.S.A., Inc., IP Division

(57) ABSTRACT

Force sensors capable of measuring only forces in xyz coordinate axis directions are installed in fingertips, respectively, and forces and moment forces acting on a robot hand are calculated based on positional information about each fingertip. This structure eliminates the need for using large force sensors to thereby enable downsizing of each fingertip, and enables detection of loads and moment forces acting on the robot hand.

12 Claims, 11 Drawing Sheets

(51) Int. Cl.
  *B25J 15/00*  (2006.01)
  *B25J 15/10*  (2006.01)
  *B25J 13/08*  (2006.01)
(52) U.S. Cl.
  CPC ........... *B25J 15/0009* (2013.01); *B25J 15/10*
    (2013.01); *G05B 2219/39409* (2013.01); *G05B*
    *2219/39466* (2013.01); *G05B 2219/39486*
    (2013.01); *G05B 2219/39505* (2013.01); *G05B*
    *2219/39528* (2013.01); *G05B 2219/39555*
    (2013.01); *Y10S 901/09* (2013.01); *Y10S*
    *901/33* (2013.01); *Y10S 901/46* (2013.01)
(58) Field of Classification Search
  CPC ........... G05B 2219/39466; G05B 2219/39486;
    G05B 2219/39409; G05B 2219/39505;
    G05B 2219/39555; G05B 2219/39528;
    Y10S 901/09; Y10S 901/33; Y10S 901/46
  See application file for complete search history.

(56) References Cited

U.S. PATENT DOCUMENTS

| | | | |
|---|---|---|---|
| 2006/0145494 A1* | 7/2006 | Nihei | B25J 9/1612 |
| | | | 294/106 |
| 2007/0219668 A1* | 9/2007 | Takahashi | B25J 9/1612 |
| | | | 700/249 |
| 2009/0069942 A1 | 3/2009 | Takahashi | |
| 2011/0225787 A1* | 9/2011 | Sato | B25J 9/1687 |
| | | | 29/407.01 |
| 2013/0197696 A1* | 8/2013 | Nammoto | B25J 13/085 |
| | | | 700/259 |
| 2015/0174760 A1* | 6/2015 | Fukuda | B25J 9/1633 |
| | | | 700/260 |
| 2015/0283704 A1* | 10/2015 | Watanabe | B25J 9/1697 |
| | | | 700/259 |
| 2016/0075030 A1 | 3/2016 | Takahashi | |

FOREIGN PATENT DOCUMENTS

| | | |
|---|---|---|
| CN | 102821918 A | 12/2012 |
| CN | 202726925 U | 2/2013 |
| CN | 103442859 A | 12/2013 |
| CN | 104816310 A | 8/2015 |
| CN | 105798938 A | 7/2016 |
| CN | 205466267 U | 8/2016 |
| EP | 1645374 A1 | 4/2006 |
| EP | 2686144 A1 | 1/2014 |
| JP | 01-316193 A | 12/1989 |
| JP | 03143261 B2 | 3/2001 |
| JP | 2006-102920 A | 4/2006 |
| JP | 2008-55532 A | 3/2008 |

\* cited by examiner

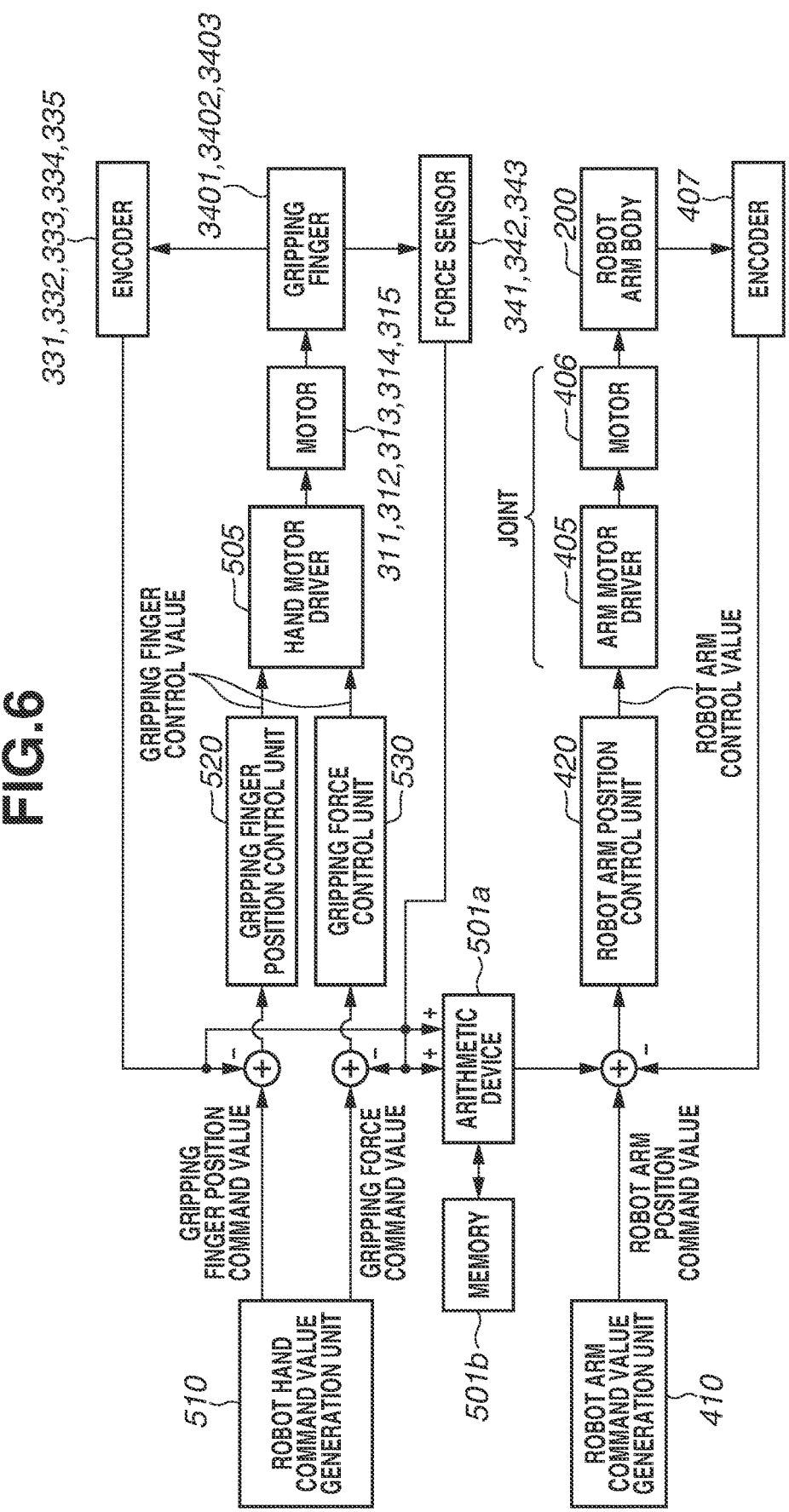

ROBOT HAND, ROBOT APPARATUS, AND CONTROL METHOD FOR ROBOT HAND

BACKGROUND OF THE INVENTION

Field of the Invention

The present invention relates to a robot hand including a force detection sensor incorporated therein.

Description of the Related Art

Industrial robot hands have been used to grip a workpiece to move the workpiece from one location to another location. In recent years, however, the robot hands have also been used to directly assemble a gripped workpiece to another workpiece. In an assembly that requires highly accurate fitting and determination of contact between workpieces, it is necessary to detect a reaction force, which is generated during assembly, near the fingers of a robot hand, and to reflect the detected reaction force in assembly control. In this regard, Japanese Patent Application Laid-Open No. H01-316193 proposes a technique in which force detection sensors for detecting forces in six axis directions, including forces in XYZ-coordinate axis directions and moment forces about each axis, are incorporated near the fingers of a robot hand, and forces generated when a workpiece is gripped by the robot hand are detected for assembly control with a high accuracy.

SUMMARY OF THE INVENTION

According to an aspect of the present invention, a robot hand having a plurality of gripping fingers configured to grip an object, the robot hand including an opening/closing driving mechanism configured to drive the opening and closing of the plurality of gripping fingers, a plurality of force detection units configured to detect force information about a force that acts on each of the plurality of gripping fingers, a position detection unit configured to detect positional information that represents the position of each of the plurality of gripping fingers in a predefined coordinate system, and a control unit configured to control the robot hand, wherein the control unit is configured to calculate forces three axis directions acting on a predefined position on the robot hand, and is configured to calculate a moment that acts about each of the three axes, based on the force information detected by the force detection unit and the positional information detected by the position detection unit.

Further features of the present invention will become apparent from the following description of exemplary embodiments with reference to the attached drawings.

BRIEF DESCRIPTION OF THE DRAWINGS

FIG. 6 is a control block diagram associated with the moment calculation unit according to the first exemplary embodiment.

DESCRIPTION OF THE EMBODIMENTS

Figure 1:
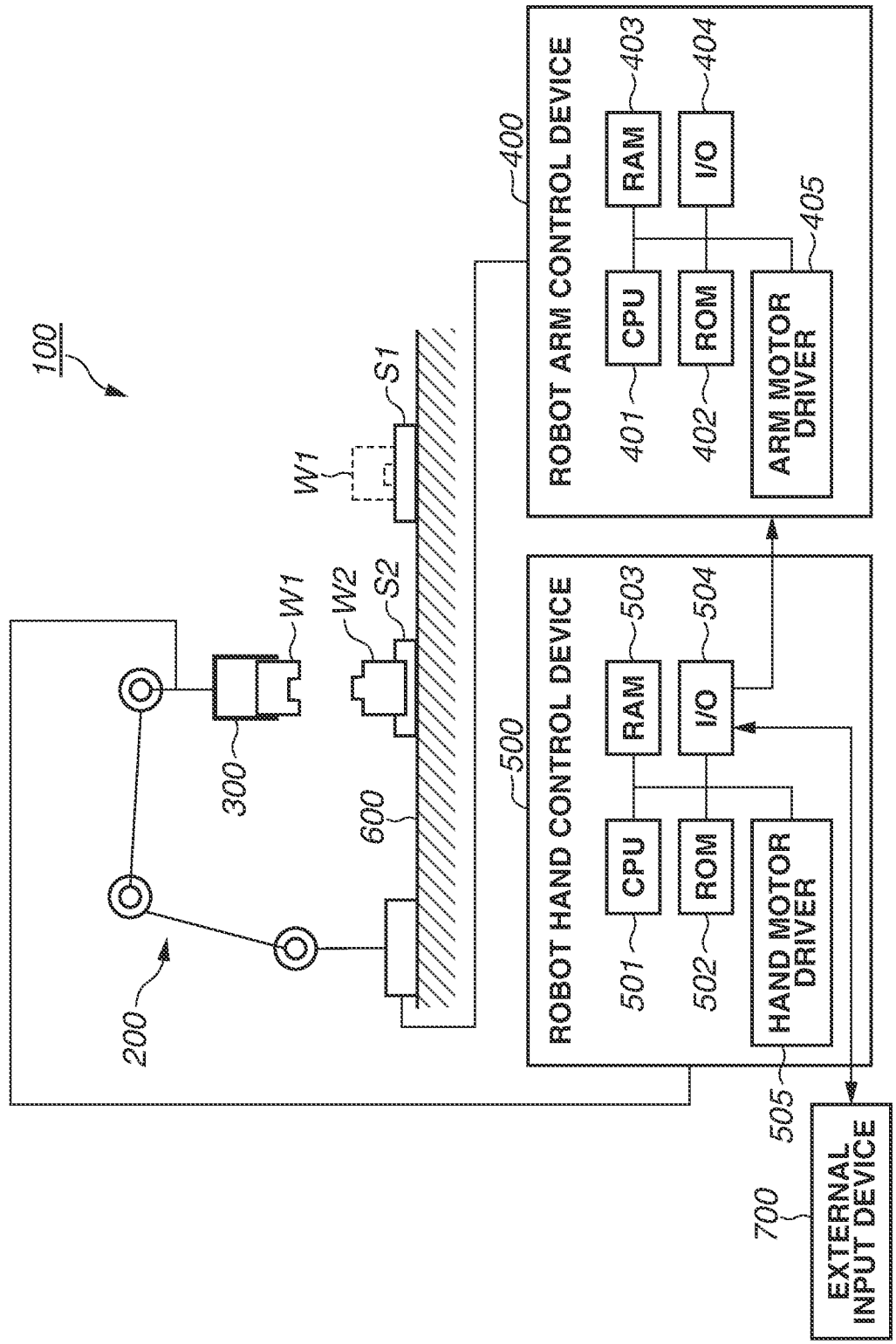
FIG. 1 is an explanatory diagram illustrating a schematic structure of a robot system according to a first exemplary embodiment.

In the method discussed in Japanese Patent Application Laid-Open No. H01-316193, the force sensors for detecting forces in six axis directions are provided near fingers of a robot hand. This leads to an increase in the size of the finger portion of the robot hand. In the case of performing an operation for assembling workpieces, the finger portion of the robot hand approaches a workpiece to be assembled. Therefore, there is a demand for downsizing the finger portion so as to prevent the robot hand from interfering with the workpiece to be assembled.

The force sensors in which electric wiring is provided are provided near the finger members which frequently operate. Accordingly, it is highly likely that a disconnection or contact failure occurs in the wiring in the force sensors, which leads to a deterioration in the reliability of the force sensors. In addition, checking is required for each axis during calibration or maintenance of the force sensors, which leads to a complicated operation.

Accordingly, the technical issue to be solved by the present invention is to propose a robot hand which has a structure in which force detection sensors with a small number of axes are installed near fingers of the robot hand and which is capable of calculating forces in three axis directions at an arbitrary position and moment forces about three axes based on measured values of the force detection sensors and positional information about the fingers.

Modes for carrying out the present invention will be described below with reference to the accompanying drawings. The following exemplary embodiments are illustrated by way of example only. For example, the detailed structure can be modified as appropriate by those skilled in the art without departing from the scope of the present invention. Numerical values taken in the present exemplary embodiments are reference numerical values and thus are not intended to limit the present invention.

In the present exemplary embodiments, forces in three axis directions at an arbitrary position on the robot hand and moment forces about three axes are calculated based on a gripping force of each of a plurality of gripping fingers to grip an object to be gripped and positional information about the plurality of gripping fingers. In the following exemplary embodiments, a gripping device and gripping portions correspond to the robot hand and the gripping fingers of the robot hand, respectively.

In general, a gripping force of each of a plurality of gripping fingers provided on a robot hand is calculated by a control device (e.g., a central processing unit (CPU) 501 described below) using a parameter (e.g., driving power, current, or servo control information) of a driving source for controlling a relative displacement of the gripping fingers. However, in the present exemplary embodiments, the gripping force is actually measured by force sensors arranged near the gripping fingers of the robot hand. This structure enables the robot hand to be controlled more accurately depending on the gripping status. As the force sensors, load cells, strain gauges, or force detection devices of a system that optically measures a deformation amount of a detection portion.

A structure and gripping control according to a first exemplary embodiment will be described below with reference to the accompanying drawings. FIG. 1 illustrates a schematic structure of a robot system according to the present exemplary embodiment.

A robot system 100 according to the present exemplary embodiment includes a robot arm body 200, a robot hand body 300, a robot arm control device 400, and a robot hand control device 500. A workpiece W1, which is a part for assembly, is placed on a workpiece mounting base S1, and a workpiece W2, which is an object to be assembled, is fixed onto a workpiece fixed base S2.

The robot system 100 operates the workpieces W1 and W2 to be assembled, thereby enabling manufacturing of an industrial product or parts thereof. For example, the assembly operation for the workpieces W1 and W2 is carried out in such a manner that the workpiece W1 is gripped and moved as an object to be gripped using the robot arm body 200 and the robot hand body 300 and then the workpiece W1 is fit to an assembly portion of the workpiece W2.

The robot arm body 200 is an articulated robot arm in the present exemplary embodiment. A bottom of the robot arm body 200 is fixed to a base 600. The robot hand body 300, which is a gripping device, is mounted at a leading edge of the robot arm body 200. An operation is performed on the workpiece W1 through the robot hand body 300. Each joint of the robot arm body 200 is provided with a motor as a driving source for driving the corresponding joint, and an encoder as a detector for detecting a rotation angle of the motor.

The robot arm control device 400 calculates an angle to be formed by the joints of the robot arm body 200 for a target position posture of the robot hand body 300, and outputs a command value to a servo circuit (not illustrated) that controls the motor of each joint. The robot hand control device 500 is connected to the robot arm control device 400 and outputs a gripping command to the robot hand body 300. The gripping command is output as, for example, data (gripping command table) representing a number or a numerical value.

As illustrated in FIG. 1, the robot hand control device 500 includes the CPU 501, which is composed of a microprocessor or the like, and a read-only memory (ROM) 502, a random access memory (RAM) 503, a general-purpose signal interface 504, and a hand motor driver 505, which are connected to the CPU 501 via a bus. The ROM 502 stores programs for controlling the robot hand body 300. A gripping command can be output by a user using an external input device 700. Examples of the external input device 700 include a teaching pendant.

The robot arm control device 400 can include a CPU (401), a ROM(402), a RAM(403), a general-purpose signal interface(404), a motor driver, and the like, like the components 501 to 505 of the robot hand control device 500. Among these components, the general-purpose signal interface 504 is used to communicate with a sensor and the like in each unit of the robot arm body 200, and an arm motor driver 405 is used to control the motor for driving each joint of the robot arm body 200.

Figure 2:
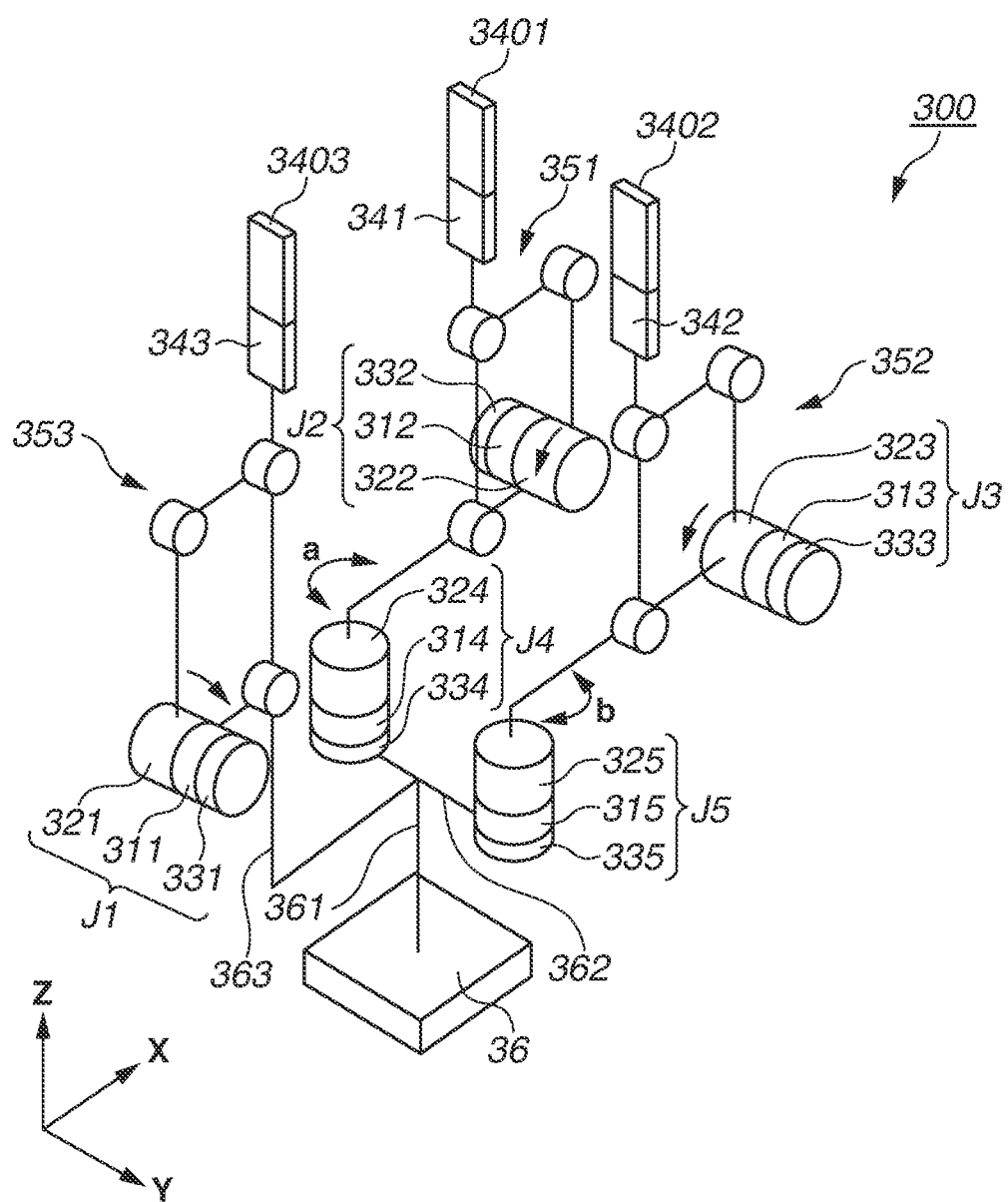
FIG. 2 is an explanatory diagram illustrating a schematic structure of the robot hand according to the first exemplary embodiment.

FIG. 2 illustrates a schematic structure of the robot hand body 300 according to the first exemplary embodiment. The robot hand body 300 includes three gripping fingers 3401 to 3403 as the gripping portions.

The gripping fingers 3401 to 3403 are controlled to be displaced relatively to links 351, 352, and 353, respectively, by joints J1 to J5 that are rotationally driven. This structure allows the gripping fingers 3401 to 3403 to operate so as to grip each object to be gripped (each workpiece described below), or release the gripped object. Accordingly, the gripping fingers 3401 to 3403 of the robot hand body 300 are driven by the joints J1 to J5.

Each of the links 351 to 353 included in a part of a drive transmission system of each of the gripping fingers 3401 to 3403 of the robot hand body 300 is, for example, a so-called parallel four-bar link mechanism as illustrated in FIG. 2. With this structure, the gripping fingers 3401 to 3403 can be opened or closed, for example, while maintaining a parallel posture. Any mechanism other than the parallel link mechanism can be used, as long as the mechanism enables the gripping fingers 3401 to 3403 to be opened or closed while maintaining the parallel posture.

The links 351, 352, and 353 for controlling the relative displacement of the gripping fingers 3401 to 3403 are driven by motors 311, 312, and 313, respectively, which are provided in the joints J1, J2, and J3, respectively. The links 351 to 353 and the motors 311 to 313 are examples of an opening/closing driving mechanism.

In the present exemplary embodiment, among the three gripping fingers, the two gripping fingers 3401 and 3402 are provided with the motors 314 and 315, respectively, so that the gripping fingers 3401 and 3402 are allowed to turn in directions indicated by arrows "a" and "b", respectively, by the joints J4 and J5 each having a degree of freedom of 1. This structure enables control of a turning posture of each of the gripping fingers 3401 and 3402 with respect to the gripping finger 3403. The motors 314 and 315 described above are examples of a turning driving mechanism.

The driving mechanism for the gripping fingers 3401 to 3403 is supported by a base 36 of the robot hand body 300 that is attached to the leading edge of the robot arm body 200. An XYZ coordinate system illustrated in FIG. 2 is a common coordinate system of the robot arm body 200 with an origin at, for example, one point on an upper surface of the base 36 where a central axis 361 of the base 36 passes.

Referring to FIG. 2, a support portion 362, which is illustrated in a simplified manner, is supported at the central axis 361 of the base 36, for example, in parallel to the Y-axis on the robot hand coordinate system XYZ, so as to connect the joint J4 of the gripping finger 3401 and the joint J5 of the gripping finger 3402. The joint J1 of the gripping finger 3403 is supported at the same height as the joints J4 and J5 above the base 36 through a support portion 363 which is illustrated in an L-shape for convenience of illustration.

The joints J4 and J5 operate independently of each other and are driven with individual amounts of driving. In the present exemplary embodiment, the gripping fingers 3401 and 3402 are controlled to take a turning posture symmetric with respect to the gripping finger 3403. In the present exemplary embodiment, a turning angle of each of the gripping fingers 3401 and 3402 that are allowed to turn by the joints J4 and J5, respectively, is represented using an angle formed by the joints J4 and J5, which are arranged substantially in parallel to the Y-axis, with respect to the support portion 362, for convenience of illustration.

For example, FIG. 2 illustrates a state where, when the joints J4 and J5 form an angle of 90° with respect to the support portion 362 (or the Y-axis), the gripping finger 3401 and the gripping finger 3402 are arranged to face each other with respect to the gripping finger 3403. An angle formed by the joints J4 and J5 when the joints J4 and J5 are rotated by 90° in each of the directions of "a" and "b" illustrated in in FIG. 2 from the state illustrated in FIG. 2 is hereinafter represented as 0°. An angle formed by the joints J4 and J5 when the joints J4 and J5 are rotated by 60° in each of the directions "a" and "b" illustrated in FIG. 2 from the state illustrated in FIG. 2 is hereinafter represented as 30°. In the present exemplary embodiment, for example, in FIG. 5 and the like described below, the above-described values may also be used as the rotation angles of the joints J4 and J5.

Referring to FIG. 2, the links of the gripping fingers are driven through reduction gears 321, 322, 323, 324, and 325 which are directly connected to the motors 311, 312, 313, 314, and 315, respectively, and the force sensors 341, 342, and 343 can detect forces acting on the respective gripping fingers. The motors 311, 312, 313, 314 and 315 are respectively provided with encoders 331, 332, 333, 334 and 335 that detect the rotation angle of the corresponding motor.

The CPU 501 in the robot hand control device 500 can calculate the rotation angle of each of the joints J1 to J5 by using output values of the encoders 331 to 335. In this case, the CPU 501 can convert the output values of the encoders 331 to 335 into the rotation angles of the joints J1 to J5, respectively, by using a reduction gear ratio of the reduction gears 321 to 325. Thus, values representing positional information about each gripping finger on the robot hand coordinate system XYZ can be detected.

The encoders 331 to 335 are examples of a position detection unit that detects positional information about the opening/closing driving mechanism and the turning driving mechanism. Specifically, as illustrated in FIG. 2, a movement position where the gripping finger 3401 is moved by the link 351 can be detected, and the parallel movement of the gripping fingers 3401 and 3402 by the links 351 and 352 and the movement position and turning angle of the gripping fingers 3401 and 3402 when the gripping fingers 3401 and 3402 are allowed to turn by the joints J4 and J5 can be detected.

Figure 3:
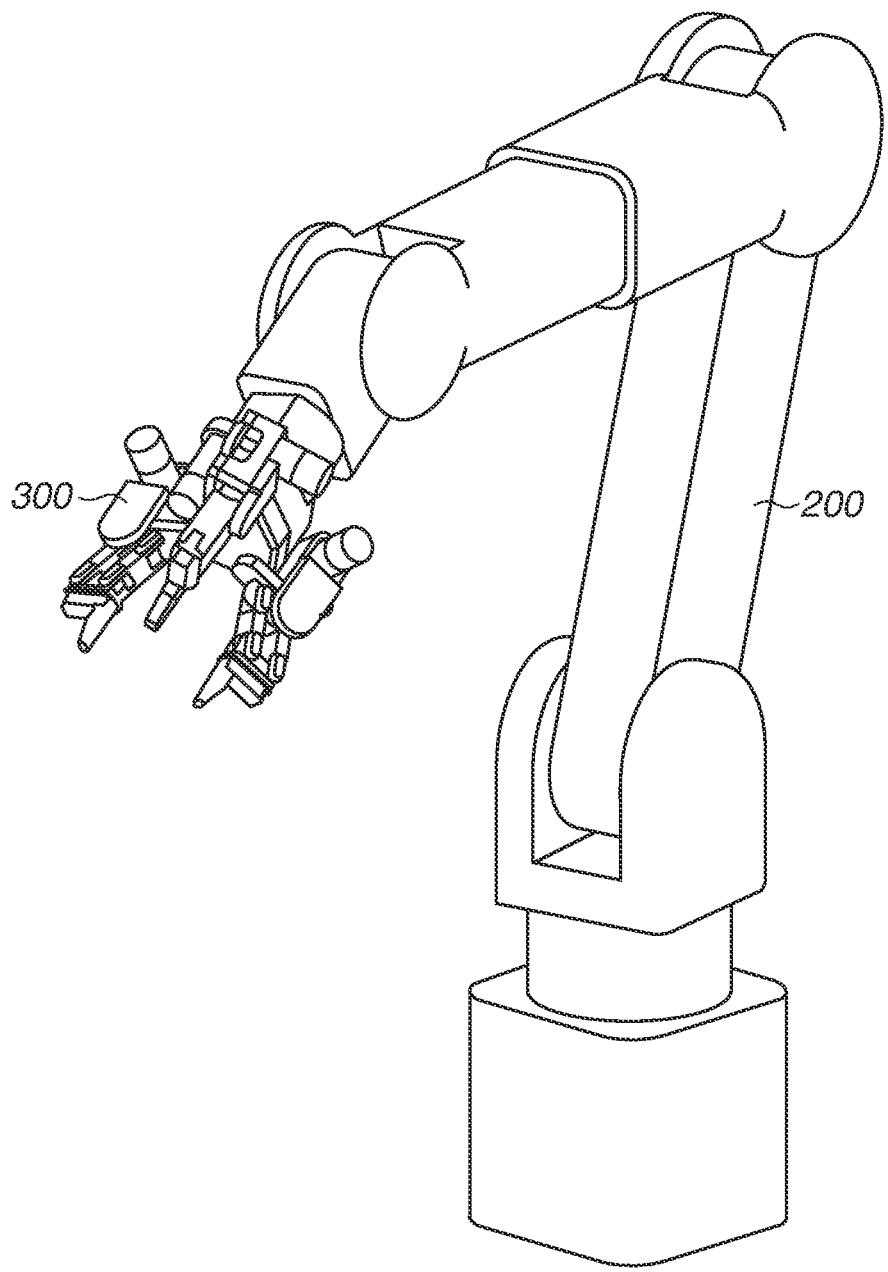
FIG. 3 is an appearance view illustrating the robot hand and a robot arm according to the first exemplary embodiment.

FIG. 3 illustrates an appearance view when the robot hand body 300 is attached to the leading edge of the robot arm body 200. As the robot arm body 200 according to the present exemplary embodiment, an articulated arm is used, but instead a robot arm with a single joint that moves about only one axis can be used. A robot apparatus as illustrated in FIG. 3 is used for the robot system 100 illustrated in FIG. 1 to perform the operation of gripping and assembling workpieces.

Figure 4:
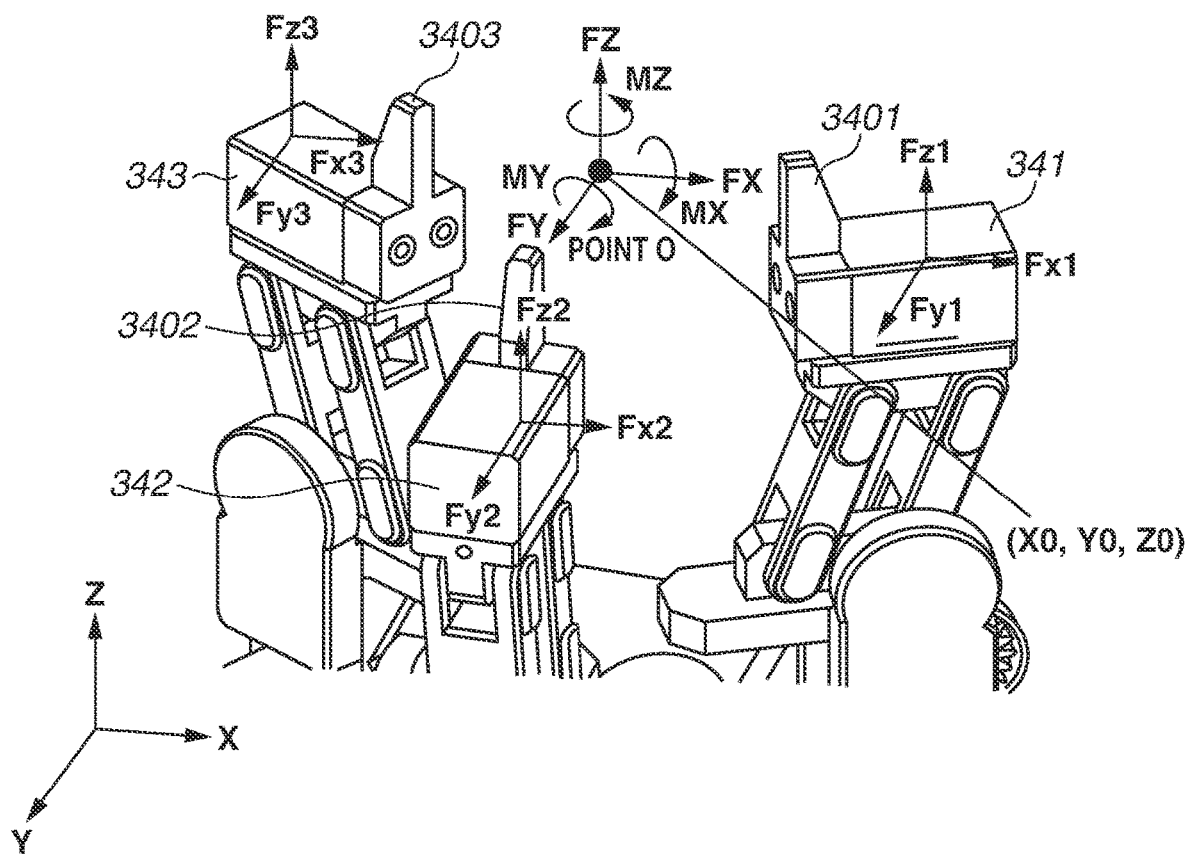
FIG. 4 is an explanatory diagram Illustrating a structure associated with a gripping fingertip portion of the robot hand according to the first exemplary embodiment.

FIG. 4 illustrates details of the leading edge of the robot hand body 300 according to the present exemplary embodiment. In the present exemplary embodiment, the force sensors 341, 342, and 343 are provided at the leading edges of all the gripping fingers 3401, 3402, and 3403, respectively, and thus can detect a load (force information) applied to each of the gripping fingers. The force sensors 341, 342, and 343 are examples of a force detection unit.

In the present exemplary embodiment, the gripping fingers 3401, 3402, and 3403 are respectively provided with the force sensors 341, 342, and 343. These force sensors are provided so as to detect moments about each axis of the entire robot hand based on an arbitrary position on the robot hand coordinate system XYZ by using the gripping force applied to each gripping finger and the positional information about each gripping finger. In FIG. 4, a point O corresponds to the arbitrary position. In the present exemplary embodiment, magnetic three-axis force sensors are used for the gripping fingers, but instead strain gauges can be used, as long as a load (force information) applied to each gripping finger can be detected.

With the structure described above, the load (force information) applied to each gripping finger and the positional information about each gripping finger can be detected and the moment acting on the entire robot hand can be calculated by a calculation unit described below. The moment calculation unit according to the first exemplary embodiment will be described below with reference to FIGS. 4 and 5.

In FIG. 4, the measured values of the force on the gripping finger coordinate system xyz that is detected by the force sensor 341 installed in the gripping finger 3401 are respectively represented by Fx1, Fy1, and Fz1. The measured values of the force on the gripping finger coordinate system xyz that is detected by the force sensor 342 installed in the gripping finger 3402 are respectively represented by Fx2, Fy2, and Fz2. The measured values of the force on the gripping finger coordinate system xyz that is detected by the force sensor 343 installed in the gripping finger 3403 are respectively represented by Fx3, Fy3, and Fz3. Forces generated about the arbitrary point O (X0, Y0, Z0) on the robot hand coordinate system XYZ are respectively represented by FX, FY, and FZ, and moment forces generated about each axis are respectively represented by MX, MY, and MZ.

Figure 5:
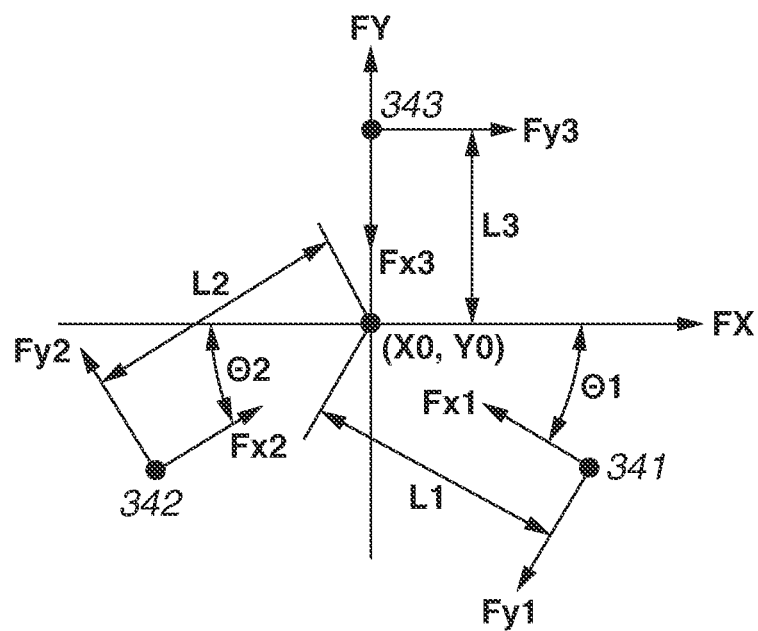
FIG. 5 is an explanatory diagram Illustrating a calculation method associated with a moment calculation unit according to the first exemplary embodiment.

For ease of explanation, assume that, as illustrated in FIG. 5, an XY coordinate plane representing forces detected by the force sensors 341, 342, 343 installed in the respective fingers and an XY coordinate plane representing forces acting on the arbitrary point O on the robot hand coordinate system XYZ are on the same plane. Assume a case where the force Fx3 in the x-axis direction that is detected by the force sensor 343 and the force FY acting on the arbitrary point O on the robot hand coordinate system XYZ act in opposite directions on the same axis.

In this case, as the positional information about each gripping finger, a distance from the position of the force sensor 341 to the arbitrary point O on the robot hand coordinate system XYZ is represented by L1. Similarly, distances from the positions of the force sensor 342 and the force sensor 343 to the arbitrary point O on the robot hand coordinate system XYZ are respectively represented by L2 and L3. An angle formed between the force Fx1 detected by the force sensor 341 and the force FX acting on the arbitrary point O on the robot hand coordinate system XYZ is represented by Θ1. An angle formed between the force Fx2 detected by the force sensor 342 and the force FX acting on the arbitrary point O on the robot hand coordinate system XYZ is represented by Θ2. The distances L1, L2, and L3 are calculated based on the rotation angles of the motors 311, 312, and 313 that drive gripping of the fingers. The angles Θ1 and Θ2 are calculated based on the rotation angles of the motors 314 and 315 that drives the turning motion.

When a workpiece (not illustrated) receiving an external force is gripped by the three finger members (gripping fingers 3401, 3402, 3403) and remains still, the external force acting on the arbitrary point O on the robot hand coordinate system XYZ and the forces applied to the three force sensors 341, 342, 343 are balanced. Therefore, the forces and moment forces applied to the robot hand body 300 can be calculated by solving the force balance formula as expressed by the following formula:

$$FX=-Fx1\cos\Theta1-Fy1\sin\Theta1+Fx2\cos\Theta2-Fy2\sin\Theta2+Fy3 \quad (1),$$

$$FY=Fx1\sin\Theta1-Fy1\cos\Theta1+Fx2\sin\Theta2-Fy2\cos\Theta2+Fx3 \quad (2),$$

$$FZ=Fz1+Fz2+Fz3 \quad (3),$$

$$MX=-Fz1L1\sin\Theta1-Fz2L2\sin\Theta2+Fz3L3 \quad (4),$$

$$MY=-Fz1L1\cos\Theta1+Fz2L2\cos\Theta2 \quad (5), \text{ and}$$

$$MZ=-Fy1L1-Fy2L2-Fy3L3 \quad (6),$$

where L1 to L3 each represent the distance from each gripping finger on the robot hand coordinate system XYZ to the arbitrary position (point O) on the robot hand body 300, and $\Theta1$ and $\Theta2$ each represent the turning angle of each gripping finger on the robot hand coordinate system XYZ. Note that these turning angles are obtained from the encoders provided in the respective gripping fingers.

The formulas are calculated by the CPU 501 serving as the calculation unit to obtain the forces (FX, FY, FZ) in the XYZ-coordinate axis directions about the arbitrary point O on the robot hand body 300 and the moments MX, MY, and MZ about each axis.

Assume that, in the present exemplary embodiment, for ease of explanation, the XY coordinate plane representing forces detected by the force sensors 341, 342, and 343 installed in the respective fingers and the XY coordinate plane representing forces acting on the arbitrary point O on the robot hand coordinate system XYZ are on the same plane. In addition, assume a case where the force Fx3 in the x-axis direction that is detected by the force sensor 343 and the force FY acting on the arbitrary point O on the robot hand coordinate system XYZ act in opposite directions on the same axis. However, the reference position of the robot hand body 300 is not limited to the above examples. Even when an arbitrary position is set at a bottom portion or the like of the robot hand body 300, moment forces can be obtained by solving the force balance formula in the same manner as described above.

As described above, the forces in the three axis directions x, y, and z acting on the respective gripping fingers and the positional information about each gripping finger can be detected and the forces in the X, Y, and Z-axis directions acting on the arbitrary point O on the robot hand and the moment about each axis can be obtained without the need for mounting large, expensive six-axis sensors near the gripping fingers.

FIG. 6 illustrates a control block diagram of the present exemplary embodiment including the moment calculation unit described above. The moment calculation unit is implemented by an arithmetic device 501*a* which is provided in the CPU 501 within the robot hand control device 500.

First, a workpiece is gripped. In this case, the movement position and the turning angle of each of the force sensors 341, 342, and 343, which are provided in the respective gripping fingers, on the robot hand coordinate system XYZ are detected from the outputs of the encoders in consideration of the motors and reduction gears, and the load (force information) applied to each gripping finger detected from the force sensors. Further, the moment calculation unit calculates the moment about the arbitrary point on the robot hand coordinate system XYZ. Information about the positions of the force sensors provided in the respective gripping fingers, the load acting on the gripping surface of each gripping finger, and the calculated moment is calculated and updated in real time.

The arithmetic device 501*a* also serves as a command generation unit for the robot arm control device 400 that controls the robot arm body 200. The ROM 502 stores allowable moment values for workpieces to be gripped. With this structure, an error display through comparison of the stored moment values and the moment value calculated by the arithmetic device 501*a*, and an instruction for varying the gripping posture can be performed on the robot arm control device 400.

As described above, based on the calculated moment value, the detected load, the movement position, and the turning angle, a change in moment generated when a gripping deviation occurs is detected using the arbitrary point O on the robot hand coordinate system XYZ as the center of gravity of the gripped workpiece. Further, the command value is output to the robot arm control device 400 and the position of the robot hand body 300 is controlled, whereby workpieces can be accurately assembled.

Referring to FIG. 6, the robot hand command value generation unit 510 generates a gripping finger position command value representing a target position of each gripping finger of the robot hand body 300 and a gripping force command value representing a target value of the gripping force. The robot arm command value generation unit 410 generates a robot arm position command value representing a target position of the entire robot hand body 300 so that the robot hand body 300 can grip a workpiece.

The gripping finger position command value generated by the robot hand command value generation unit 510 is supplied to the gripping finger position control unit 520 and the gripping force command value generated by the robot hand command value generation unit 510 is supplied to the gripping force control unit 530. At the target position according to the gripping finger position command value, control values for driving the respective gripping fingers are generated so that the workpiece can be gripped with the gripping force according to the gripping force command value. The generated control values are supplied to the hand motor driver 505 to drive the motors 311 to 315 of the joints J1 to J5, respectively. This allows the gripping fingers 3401, 3402, and 3403 to perform the gripping operation.

In the case of performing a position control, each motor is controlled by the gripping finger position control unit 520, and in the case of performing a force control, each motor is controlled by the gripping force control unit 530. In the present exemplary embodiment, the motors 311, 312, and 313 of the joints J1 to J3, respectively, can perform the position control and the force control simultaneously or selectively. The motors 314 and 315 of the joints J4 and J5, respectively, are motors for allowing the gripping fingers to turn and are not involved in the operation of the link mechanism for gripping. Accordingly, the motors 314 and 315 perform only the position control and does not perform the gripping force control.

The gripping fingers are provided with the encoders 331 to 335 and the force sensors 341 to 343, respectively. Positional information on the gripping finger coordinate system xyz when a workpiece is gripped and force information (Fx, Fy, and Fz) indicating the load applied to each gripping finger are detected. These pieces of information are fed back to the input side of each of the gripping force control unit 530 and the gripping finger position control unit 520, and a feedback control for the position and gripping force of each gripping finger is carried out.

As for the control of the robot arm body 200, the robot arm position control unit 420 outputs, to the arm motor driver 405, robot arm control value for carrying the robot hand body 300 to a position near a workpiece. A driving motor 406 (illustrated as a representative of a plurality of motors disposed in the respective joints) provided in each joint of the robot arm body 200 is driven to control the position and posture of the robot arm body 200. The positional information about the robot arm body 200 at that time is detected by an encoder 407 for detecting the position of the robot arm body 200 and is fed back to the input side of the robot arm position control unit 420, whereby the feedback control of the position of the robot arm is performed.

As described above, the positional information on the gripping finger coordinate system xyz and the force information (Fx, Fy, and Fz) about each gripping finger, which are detected by the encoders 331 to 335 and the force sensors 341 to 343, respectively, are also supplied to the arithmetic device 501a at the same time. The arithmetic device 501a converts the force information (Fx, Fy, and Fz) and the positional information, which are detected in each gripping finger, into the robot hand coordinate system XYZ. The moments MX, MY, and MZ acting on the arbitrary position on the robot hand coordinate system XYZ are calculated by the above-described formulas (1) to (6).

The arithmetic device 501a is communicably connected to a memory 501b and includes a recording medium, such as a ROM, a RAM, or a flash memory. The memory 501b stores load values obtained at each gripping finger when workpieces are normally assembled, and the values of moments acting about the arbitrary position on the robot hand coordinate system XYZ. These values are compared with the detected load values Fx, Fy, and Fz obtained at the respective gripping fingers and the calculated moments MX, MY, and MZ, whereby a workpiece deviation direction is predicted.

After the deviation direction is predicted, a command value is output to the robot arm position control unit 420 so that the position of each workpiece is shifted in a direction in which a deviation is eliminated. In the present exemplary embodiment, a command value for a motor drive amount of the robot arm body 200 is output so that the workpiece can be moved by a certain amount in the deviation eliminating direction. The position of the workpiece is shifted in the deviation eliminating direction whereby appropriate assembly is enabled.

Figure 7A:
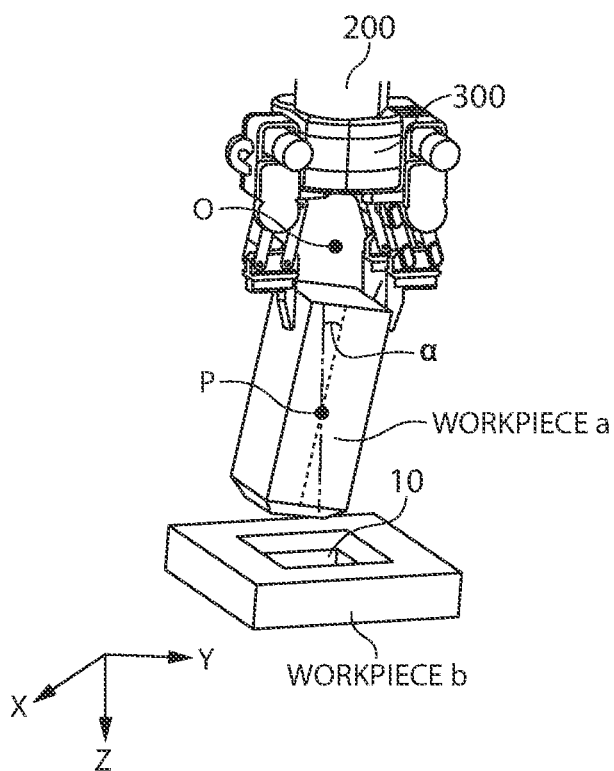
FIGS. 7A to 7D are explanatory views each illustrating a workpiece assembling operation when the robot hand according to the first exemplary embodiment is used.
Figure 7B:
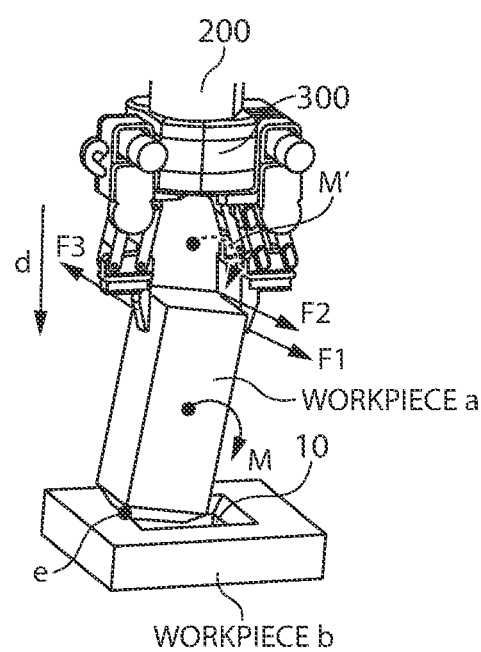
Figure 7C:
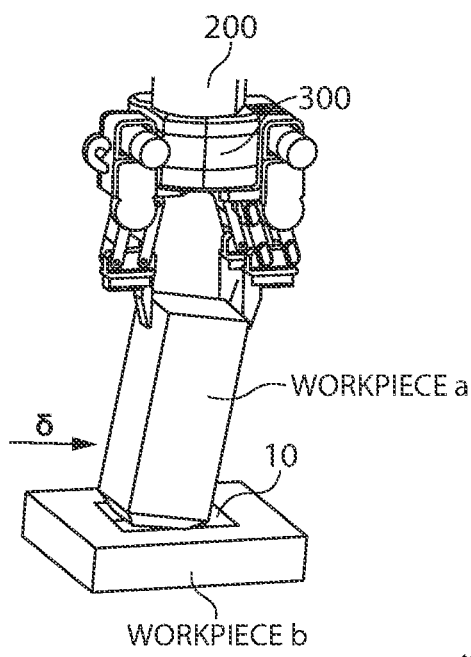

An actual assembly operation will be described with reference to FIGS. 7A to 7D and 8. FIGS. 7A to 7D are views each illustrating the process of assembling workpieces by the robot hand body 300 according to the present exemplary embodiment. FIG. 8 is a flowchart illustrating the workpiece assembly operation.

A workpiece "b" illustrated in FIGS. 7A to 7D has a recess 10 as an assembly portion to which a workpiece "a" is assembled. The workpiece "a" has a convex portion as an assembly portion to be assembled to the workpiece "b". A state where the robot arm body 200 and the robot hand body 300 are moved to a position immediately before the workpiece "a" is gripped will first be described. Assume that the robot hand body 300 constantly grips a preliminarily determined target grip position on the workpiece "a" and the workpiece "b" is fixed by a jig.

The memory 501b stores positional information about the gripping fingers when the workpiece "a" contacts the workpiece "b" when the arbitrary position on the robot hand coordinate system XYZ is set to the center-of-gravity position (point O in the present exemplary embodiment) of the robot hand. The memory 501b also stores positional information obtained when the workpiece "a" is completely inserted into the recess 10 of the workpiece "b" and force information about a reaction force received from the workpiece "b". Further, the memory 501b stores information such as the load values Fx, Fy, and Fz at the gripping fingers that are detected when the workpiece "a" is normally inserted into the recess 10 of the workpiece "b", a reaction force and the like received due to a friction or the like, and an allowable range of a change and the like in the moment values (MX, MY, and MZ).

Figure 7D:
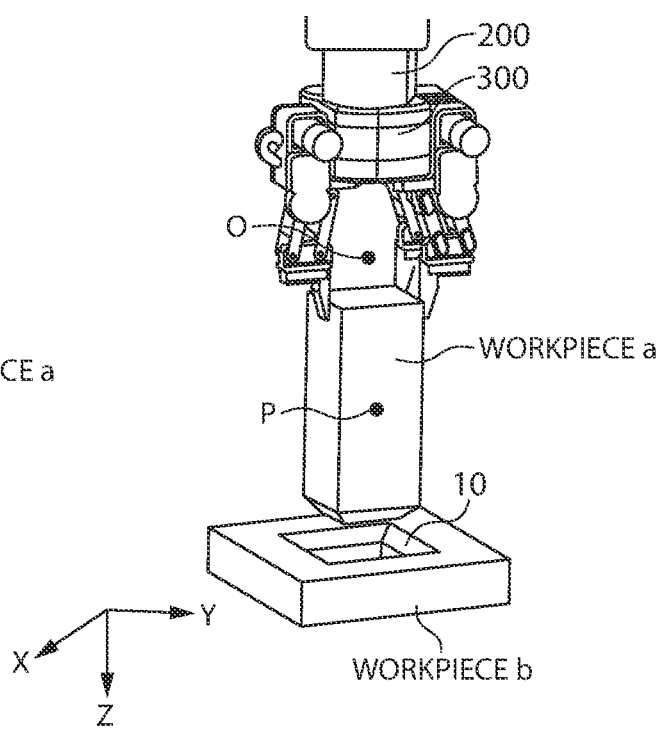
Figure 8:
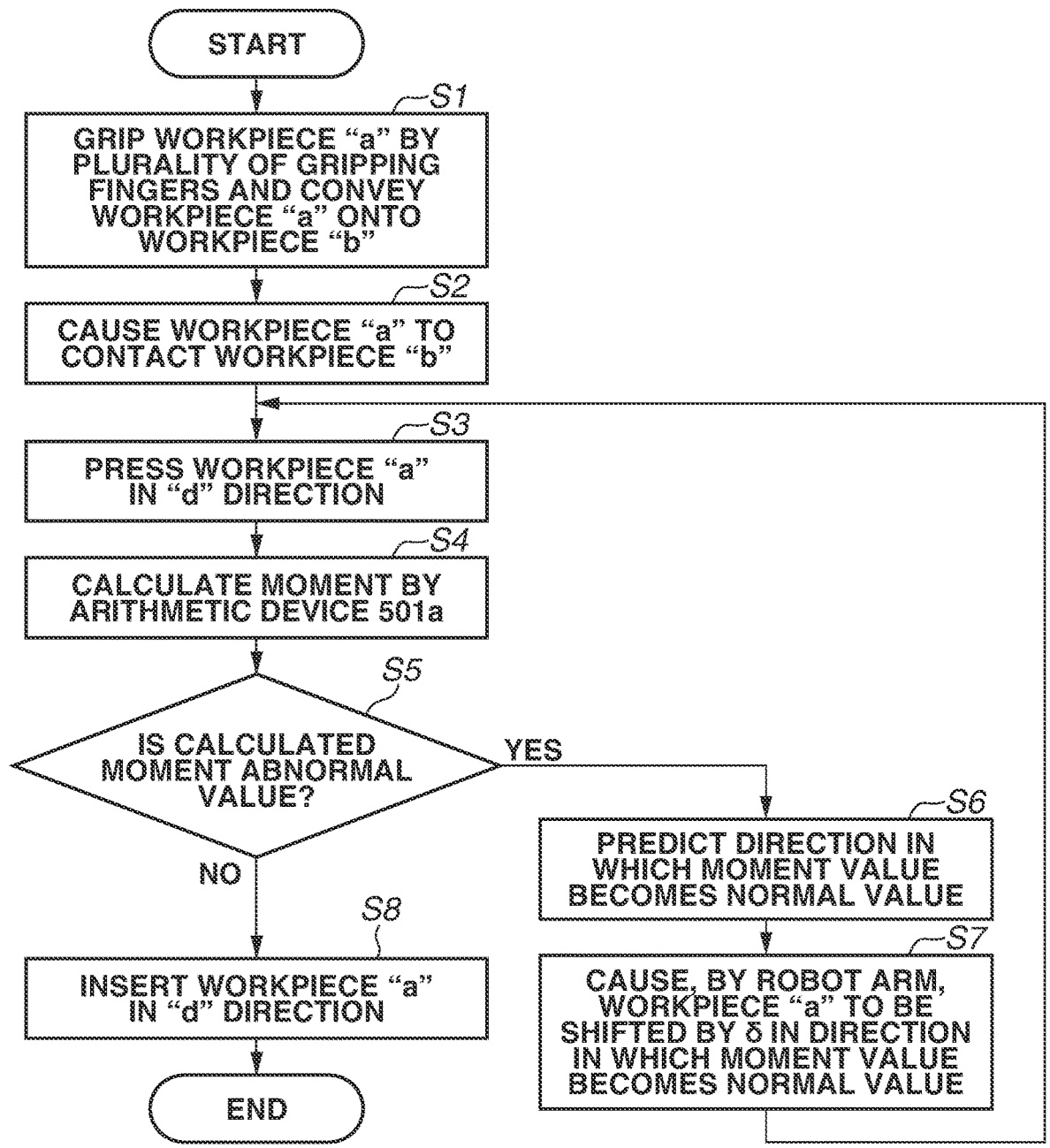
FIG. 8 is a flowchart illustrating the workpiece assembling operation when the robot hand according to the first exemplary embodiment is used.

FIG. 7D illustrates a state where the workpiece "a" is normally assembled to the recess 10 of the workpiece "b". Allowable ranges of each of the load values Fx, Fy, and Fz at the gripping fingers detected in this state and the calculated moment values (MX, MY, and MZ) are stored.

The operation of assembling the workpiece "a" to the workpiece "b" will be described below using the flowchart of FIG. 8 with reference to FIGS. 7A to 7D.

First, in step S1, the workpiece "a" is gripped by a plurality of gripping fingers and conveyed onto the workpiece "b". FIG. 7A illustrates this state and the workpiece "a" is located above the recess 10 of the workpiece "b". A misalignment with an angle α occurs in the workpiece "a" with respect to the gripping fingers and the workpiece "a" is gripped in a state where the workpiece "a" is inclined.

In this state, in step S2, the robot hand body 300 is caused to descend in an assembly direction "d" by the robot arm body 200, thereby moving the workpiece "a" to a position where the workpiece "a" contacts the workpiece "b" as illustrated in FIG. 7B. In the present exemplary embodiment, a drive amount of the robot arm body 200 when the workpieces contact each other is set in the memory and the contact between the workpieces is determined based on the drive amount. When a reaction force due to a friction or the like is inevitably generated when the workpiece "a" is inserted into the recess 10 of the workpiece "b", a threshold for a load value acting on each gripping finger can be set so that the contact between the workpieces can be determined based on the threshold.

If it is determined that the workpiece "a" contacts the workpiece "b", in step S3, the robot arm body 200 causes the workpiece "a" to further descend in the assembly direction. At this time, the loads which are indicated by arrows F1, F2, and F3, respectively, in FIG. 7B and act on the respective gripping fingers for gripping the workpieces vary. Further, since the workpiece "a" is gripped with a deviation, the workpiece "a" cannot be accurately inserted into the recess 10 of the workpiece "b" by causing the workpiece "a" to contact an edge "e" of the recess 10, with the result that a moment M is generated in a direction indicated by an arrow about the point P of the center of gravity of only the workpiece. Assuming that the moment M also acts on the point O, the arithmetic device 501a calculates, by the above-described method, the value of a moment M' acting on the center of gravity (point O) of the robot hand body 300 when the workpiece "a" is gripped, based on the detected load value and the positional information about each gripping finger (S4). In the present exemplary embodiment, the moment M' is calculated by offsetting the moment acting on the point P, which is the center of gravity of the workpiece, to the point O. Alternatively, the moment value can be calculated by directly setting the point P.

Next, the detected load value and the calculated moment value are compared with the load value and the moment value which are stored in the memory and obtained when workpieces are normally gripped and assembled in step S5. As a result of comparing the calculated moment value with the stored moment value in step S5, if it is determined that the moment value is an abnormal value (YES in step S5), the processing proceeds to step S6. If it is determined that the moment value is a normal value (NO in step S5), the processing proceeds to step S8. In the comparison, an allowable range is set based on the load value and moment value obtained when workpieces are normally gripped and assembled, and it is determined that the values are normal if the values fall within the allowable range.

Even when the workpiece "a" is accurately inserted into the recess 10, a certain amount of moment and a certain amount of reaction force are generated due to a relative friction or the like. However, if the misalignment is large, it is difficult to carry out the insertion operation itself. Accordingly, a large turning moment and a large reaction force are generated between the workpieces, which enables abnormality determination by setting the allowable range.

As a result of the comparison in step S5, if it is determined that the moment value is an abnormal value, the direction in which the moment value becomes normal is predicted from the comparison result in step S6. Specifically, the direction in which the workpiece "a" deviates can be predicted based on the direction of the turning moment indicated by the arrow M'.

Further, in step S7, a command value is output from the arithmetic device 501a to the robot arm position control unit 420 so that the workpiece "a" is caused to ascend by a predetermined amount so as to be separated from the workpiece "b" and the workpiece "a" is shifted by a certain amount δ as illustrated in FIG. 7C in a direction in which the workpiece "a" can be inserted. Then, the processing returns to immediately before step S3 to repeat the above-described loop until the detected load value and the calculated moment value become normal values.

When the position of the workpiece "a" is corrected by the certain amount δ, the following cases the following cases can be predicted based on the direction and magnitude of the reaction force and moment generated in the contact state: a case where the workpiece "a" and the workpiece "b" contact in a parallel state, a case where the workpiece "a" and the workpiece "b" contact in an inclined state, and the like. Therefore, the correction amount δ of the workpiece position is preferably used appropriately depending on the situation, such as a parallel movement or a rotational movement of the workpiece "a".

After repeating the above-described loop, if it is determined in step S5 that the detected load value and the calculated moment value are normal (NO in step S5), the processing proceeds to step S8. In step S8, the workpiece "a" is normally inserted into the workpiece "b". FIG. 7D illustrates a state where the workpiece "a" is to be normally assembled to the recess 10 of the workpiece "b". In the present exemplary embodiment, it is determined that the workpiece assembly operation is complete when the amount of descending of the arm reaches a certain amount. Alternatively, it can be determined that the insertion is completed based on a threshold set for the reaction force from the bottom surface of the recess 10 when the insertion is complete in the state illustrated in FIG. 7D.

With the control operation described above, even if the gripping position of the workpiece "a" deviates, a misalignment of the gripping position of the workpiece "a" can be detected and the misalignment can be automatically corrected, and thus the assembly operation can be accurately performed. According to this method, an accurate assembly operation can be performed without using such a system that detects a misalignment and correcting the misalignment by capturing an image of the workpiece by a camera or the like. This is not intended to exclude using image processing by image capturing. The use of the processing depending on operation conditions falls within the scope of the present invention.

As described above, in the robot hand according to the present exemplary embodiment, the force sensors installed near the gripping fingers can obtain a moment with a simpler structure than that of the related art and can accurately assemble workpieces even when a workpiece gripping deviation occurs.

In the first exemplary embodiment, the gripping fingers 3401 and 3402 perform turning driving using the two motors 314 and 315, respectively. An increase in the number of motors leads to an increase in the weight of the robot hand body 300. Since two motors are used, two encoders for detecting positional information are also required, which leads to an increase in the weight of the robot hand body 300 and complications of the moment calculation.

In the second exemplary embodiment, a gripping finger 4401 and a gripping finger 4402 are configured to be synchronized by a gear mechanism (actuator) and driven using one motor, which leads to a further reduction in the weight of the robot hand body 300 and simplification of the moment calculation.

Figure 9:
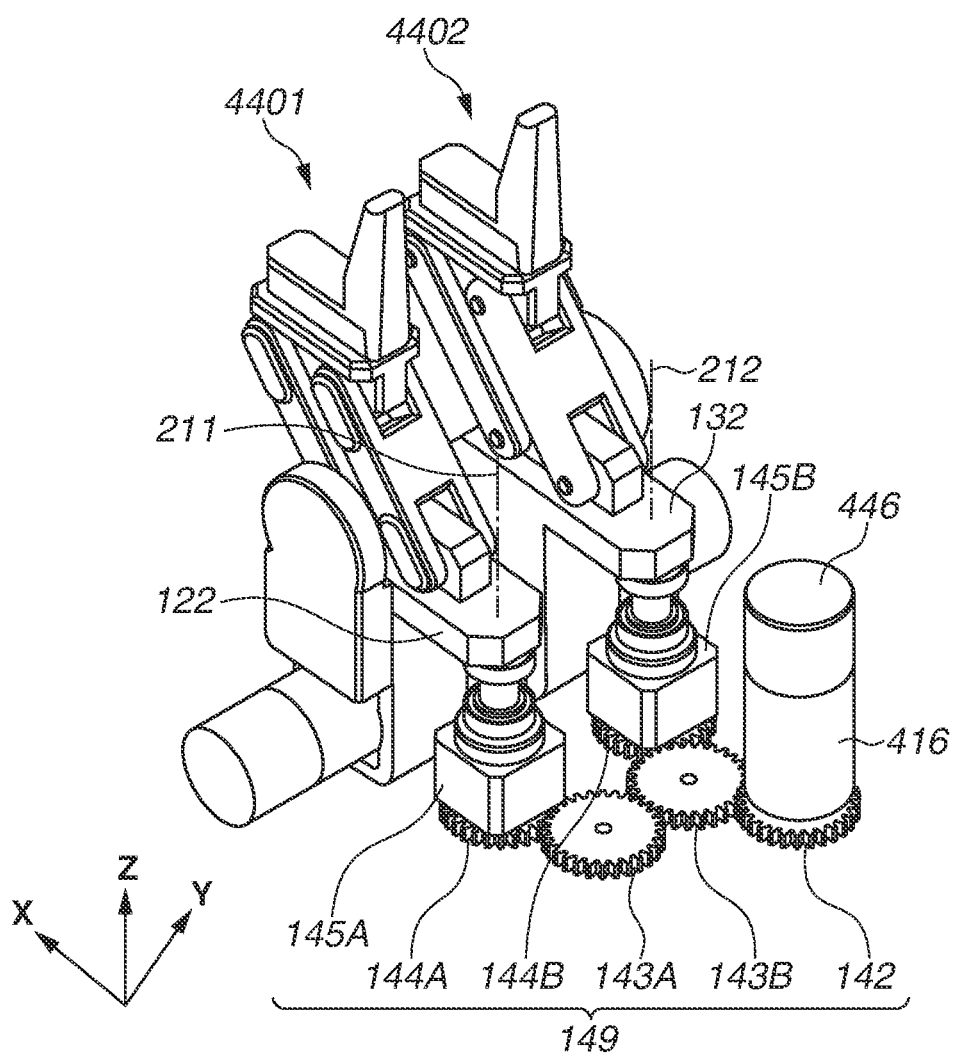
FIG. 9 illustrates a schematic structure associated with a robot hand according to a second exemplary embodiment.

FIG. 9 illustrates an example in which the gripping fingers 4401 and 4402 are driven by the gear mechanism using one motor by a method similar to that illustrated in FIG. 2. Detailed descriptions of hardware and control system components having the same configuration and operation as those of the first exemplary embodiment described above will be omitted.

In the following description, members and control functions that are identical or equivalent to those of the first exemplary embodiment are denoted by the same reference symbols. In particular, the hardware configuration associated with the arrangement of the joints, force sensors, and the like of the robot hand body 300 and the control schematic diagram for controlling the robot system are similar to those illustrated in FIGS. 4 and 6 according to the first exemplary embodiment.

FIG. 9 illustrates the configuration of each of turning gripping fingers 4402 and 4403 of the robot hand body 300 according to the present exemplary embodiment. A link mechanism for opening or closing the gripping fingers, force sensors for detecting loads on the gripping fingers, and a moment calculation device according to the present exemplary embodiment are similar to those of the first exemplary embodiment.

FIG. 9 is a perspective view illustrating a schematic structure of each of a motor 416, an encoder 446 that detects a rotation angle of the motor 416, and a transmission device 149 for distributing the rotative power of the motor 416 to turning axes 212 and 213 of the gripping finger 4402 and the gripping finger 4403, respectively.

In the present exemplary embodiment, as illustrated in FIG. 9, turning axes 211 and 212 that are coupled to the gripping finger 4401 and the gripping finger 4402, respectively, and a plurality of wave reduction gears 145A and 145B that are coupled to the turning axes, respectively, are provided. The transmission device 149 transmits the output of the motor 416, which serves as a rotational driving source, to each of the wave reduction gears 145A and 145B.

As illustrated in FIG. 9, the transmission device 149 according to the present exemplary embodiment includes a gear 142 that is coupled to, for example, the output shaft of the motor 416, gears 144A and 144B that are coupled to the input shafts of the wave reduction gears 145A and 145B, respectively, and gears 143A and 143B that are arranged between these gears. In the present exemplary embodiment, these gears are spur gears, but instead the transmission device 149 can include a pulley, a belt, and the like and worm gears and the like can also be used for some of the gears.

In the present exemplary embodiment, as illustrated in FIG. 9, the transmission device 149 transmits the output of the motor 141 from the gear 142 included in the output shaft of the motor 141 to the gear 144B that is coupled to the input shaft of the wave reduction gear 145B through the intermediate gear 143B. Further, the intermediate gear 143B transmits the output of the motor 141 to the gear 144A that is coupled to the input shaft of the wave reduction gear 145A through the intermediate gear 143A. To implement the turning control for the grip portion according to the present exemplary embodiment, the number of teeth of the intermediate gear 143A is preferably set to be equal to the number of teeth of the intermediate gear 143B. With this structure, a change gear ratio from the motor 141 to the wave reduction gear 145A and a change gear ratio from the motor 141 to the wave reduction gear 145B are the same change gear ratio and the rotational driving directions are opposite to each other. In the present exemplary embodiment, as described above, the rotational driving force of the motor 141 is transmitted to input shafts 146A and 146B (FIG. 10) of the wave reduction gears 145A and 145B by rotating in opposite directions.

Figure 10:
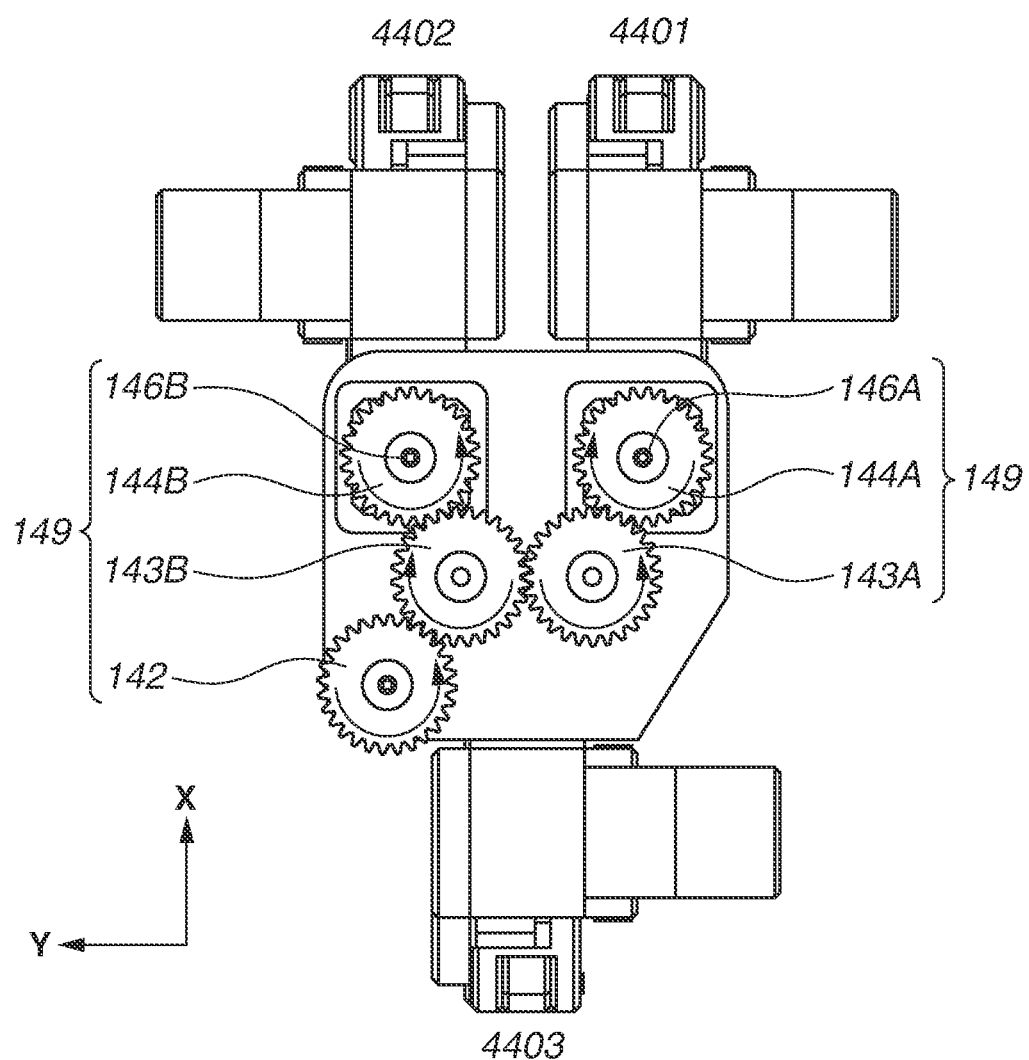
FIG. 10 is a view of a drive transmission system associated with the robot hand according to the second exemplary embodiment as viewed from below.
Figure 11:
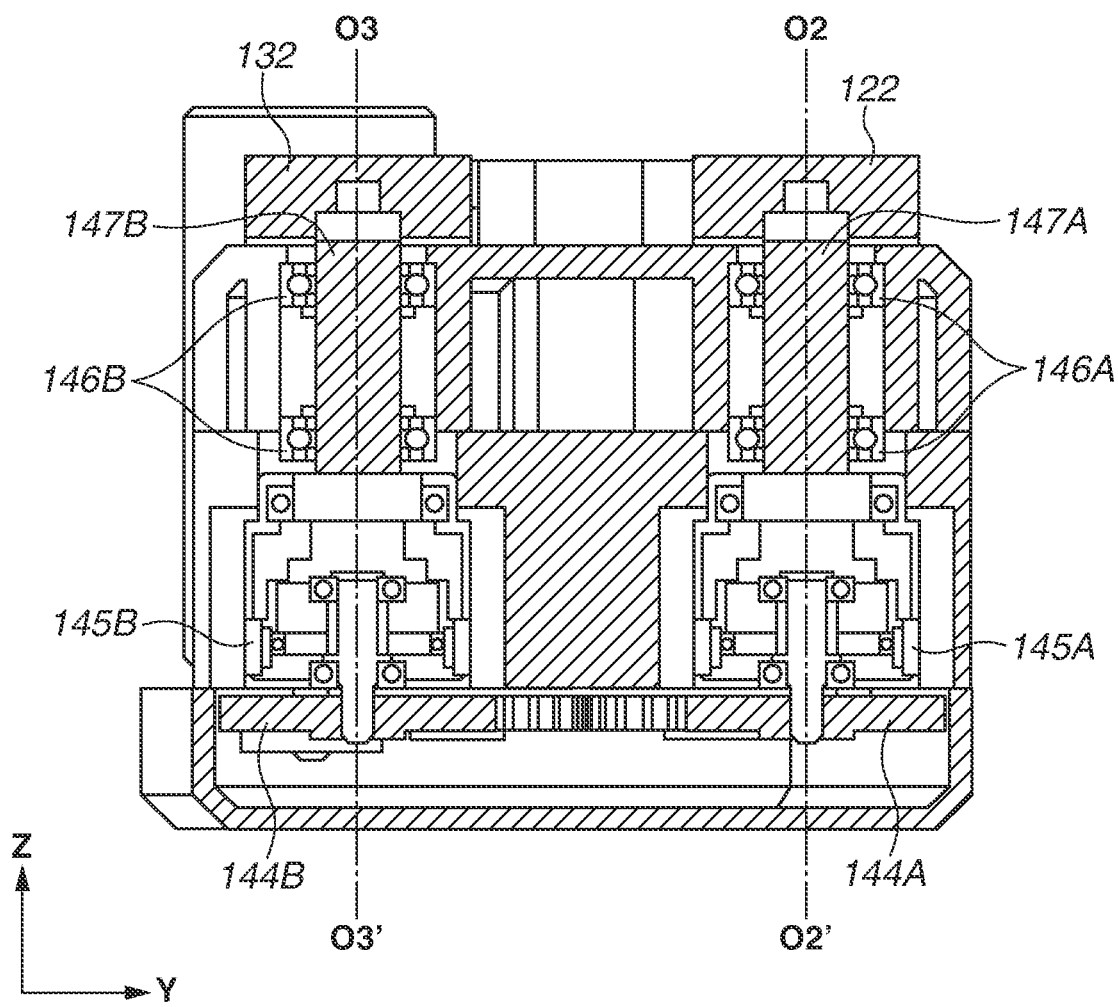
FIG. 11 is a sectional view illustrating the drive transmission system associated with the robot hand according to the second exemplary embodiment.

FIG. 10 illustrates the drive transmission system illustrated in FIG. 9 as viewed from below. FIG. 11 illustrates a sectional structure of the drive transmission system illustrated in FIG. 9. As illustrated in FIGS. 10 and 11, the branched rotational driving force is transmitted to the input shaft through the gear 144A using an axis O2' of the wave reduction gear 145A as a rotation center. The branched rotational driving force transmitted to the rotational shaft 147A through the wave reduction gear 145A using the axis O2 set in the support portion 122 of the gripping finger 4401 as a rotation center. The rotational shaft 147A is supported by the bearing 146A for receiving the load applied to the gripping finger 4402 on the support portion 122.

In particular, in the transmission system, as indicated by a dashed-dotted line, the axis O2, which is the rotation center of the turning axis of the gripping finger 4402, and the axis O2', which is the rotation center of the input shaft of the wave reduction gear 145A, are arranged on the same axis. To satisfy such a coaxial relationship, for example, the wave reduction gear 145A is preferably attached through a position adjustment mechanism illustrated in detail in the drawings so that the attaching position within a horizontal plane can be adjusted.

The transmission system for the support portion 132 of the gripping finger 4402 has a configuration similar to that described above. The rotational driving force input to the gear 144B is transmitted to a rotational shaft 147B about an axis O3 as a rotation center through the input shaft about an axis O3' of the wave reduction gear 145B and the wave reduction gear 145B. The rotational shaft 147B is supported by the bearing 146B for receiving the load applied to the gripping finger 4403.

Also in the transmission system of the gripping finger 4402, as indicated by a dashed-dotted line, the axis O3 which is the rotation center of the turning axis of the gripping finger 4403 and the axis O3' which is the rotation center of the input shaft of the wave reduction gear 145B are arranged on the same axis. To satisfy such a coaxial relationship, for example, the wave reduction gear 145E is preferably attached to the position adjustment mechanism illustrated in detail in the drawings so that the attaching position within a horizontal plane can be adjusted.

In the present exemplary embodiment, the positions of the wave reduction gears 145A and 145B in the horizontal direction are adjusted to thereby satisfy the coaxial relationship between the axis O2 and the axis O2' and the coaxial relationship between the axis O3 and the axis O3'. However, in order to ensure the coaxial relationship between the axes, a coupling can be interposed in a part of the transmission system. In this case, the process of adjusting the positions of the wave reduction gears 145A and 145B in the horizontal direction can be omitted.

As described above, the robot hand body 300 according to the present exemplary embodiment has turning axes for causing the gripping fingers 4401 and 4402 to turn and changing the direction of a displacement of each of the gripping fingers 4401 and 4402. In addition, the transmission device 149 for distributing the driving force of the motor 416 to a plurality of turning axes is disposed. The driving force distributed by the transmission device 149 is transmitted to each turning axis through the wave reduction gears 145A and 145B which are arranged between the transmission device 149 and the turning axis.

According to the structure described above, two gripping fingers can be driven by the transmission device 149 using one motor, which leads to a reduction in the weight of the robot hand body 300.

The control device, such as the CPU 501, can calculate the rotation angle of the motor 416 by using the output value from the encoder 446. In this case, the control device, such as the CPU 501, can convert the output value from the encoder 446 into each rotation angle by using the reduction gear ratio between the wave reduction gears 145A and 145B. Thus, values can be detected as the positional information about each gripping finger.

The gripping finger 4401 and the gripping finger 4402 are caused to turn in a synchronized manner by the transmission device 149. When the rotation angle of the motor 416 is $\Theta 4$, each of the absolute value of the turning angle of the gripping finger 4401 and the absolute value of the turning angle of the gripping finger 4402 is $\Theta 4$. Therefore, $\Theta 4$ is substituted into $\Theta 1$ and $\Theta 2$ in formula (6) from formula (1), and the positional information about the link mechanism and the value of the load detected by the force sensor, which are obtained in the same manner as in the first exemplary embodiment, are substituted. With this structure, like in the first exemplary embodiment, the moments acting on the X, Y, and Z axes about the arbitrary point O on the robot hand coordinate system XYZ can be obtained without the need for mounting large and expensive six-axis sensors near the gripping fingers.

Furthermore, since the number of motors and encoders to be used can be reduced, which leads to a further reduction in the weight of the robot hand body 300 as compared with the first exemplary embodiment. The amount of positional information from the encoder to be processed during calculation of moments can be reduced, so that the processing time can be reduced and the assembly operation can be rapidly performed.

In the present exemplary embodiment, as the wave reduction gear, a wave reduction gear, such as Harmonic Drive® which is preferably composed of about one gear transmission stage can be suitably used.

As described above, when a workpiece is gripped, with a mechanism for obtaining loads applied to the gripping fingers and positional information of each gripping finger, forces in the X, Y, and Z-axis directions acting on the arbitrary point O on the robot hand coordinate system XYZ and moments about each axis can be calculated. Accordingly, the moments about the arbitrary point O on the robot hand coordinate system XYZ can be calculated only by the three-axis force sensors, without providing six-axis force sensors with a complicated structure near the gripping fingers. Therefore, the moments generated during assembly when a workpiece gripping deviation occurs can be detected and the robot arm can be controlled based on the moments, whereby an accurate assembly operation can be performed.

Further, since the need for using six-axis force sensors can be eliminated, the gripping finger portion can be downsized and the interference between the plurality of workpieces and the robot hand can be reduced during the assembly operation for small workpieces. Furthermore, the number of electric wires in the sensors can be reduced and thus the possibility of occurrence of a disconnection or contact failure can be reduced.

The exemplary embodiments described above illustrate a case where the ROM 502 or the RAM 503 is used as a computer-readable recording medium and the ROM 502 or the RAM 503 stores programs. However, the present invention is not limited to this structure. A control program for carrying out the present invention can be recorded in any type of recording media, as long as the recording media are computer-readable recording media. For example, as the recording media for supplying control programs, a hard disk drive (HDD), an external storage device, a recording disk, and the like can be used.

The present invention can also be implemented in such a manner that a control program for implementing one or more functions according to the exemplary embodiments described above is supplied to a system or apparatus through a network or recording medium and one or more processors in a computer of the system or apparatus reads the control program. The present invention can also be implemented by a circuit (e.g., an application specific integrated circuit (ASIC)) for implementing one or more functions according to the exemplary embodiments described above.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is applicable to industrial robots.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-098718, filed May 18, 2017, which is hereby incorporated by reference herein in its entirety.

What is claimed is:

1. A robot apparatus including a robot hand and configured to grip a first object with a plurality of fingers disposed on the robot hand and to bring the first object into contact with a second object and insert the first object into the second object, the robot apparatus comprising:
    an opening/closing driving mechanism configured to drive the opening and closing of the plurality of fingers;
    a force detection unit disposed on each of the plurality of fingers;
    a position detection unit configured to detect a position of the plurality of fingers; and
    a control device configured to control the robot hand,
    wherein the control device is configured to bring the first object into contact with the second object by using the robot hand,
        wherein the control device is configured to obtain forces and moments that act about each of three axes when the first object is brought into contact with the second object, based on the force detection unit and the position detection unit, and
        wherein the control device is configured to determine that the first object is brought into contact with the second object in a first contact state, move the first object in a direction in which at least one of the values of the forces that act about each of the three axes and the moments that act about each of the three axes is smaller than or equal to a threshold value, and insert the first object into the second object in a case where at least one of values of the forces that act about each of the three axes and the moments that act about each of the three axes is larger than the threshold value, and
        wherein the control device is configured to determine that the forces that act about each of the three axes and the moments that act about each of the three axes are generated by a friction between the first object and the second object and insert the first object into the second object, in a case where the values of the forces that act about each of the three axes and the moments that act about each of the three axes are smaller than or equal to the threshold value.

2. The robot apparatus according to claim 1, wherein the forces that act about each of the three axes and the moments that act about each of the three axes that are equal to the threshold value are values to be obtained when the first object is inserted into the second object while the first object is in contact with the second object in a second contact state.

3. The robot apparatus according to claim 1, wherein the control device is configured to predict the direction in which at least one of the values of the forces that act about each of the three axes and the moments that act about each of the three axes is smaller than or equal to the threshold value based on the value of the moments that acts about each of the three axes.

4. The robot apparatus according to claim 2, wherein the second contact state is a state that the first object is in contact with the second object while the first object is substantially parallel with at least one of the plurality of fingers.

5. The robot apparatus according to claim 1, wherein the robot hand is disposed on a robot arm,
wherein the robot hand is moved by the robot arm and the first object is moved in a direction in which a contact position of the first object and the second object in contact with each other is a predetermined contact position move the first object in the direction in which at least one of the values of the forces that act about each of the three axes and the moments that act about each of the three axes is smaller than or equal to the threshold value, using the robot arm, and insert the first object into the second object, using the robot arm.

6. The robot apparatus according to claim 1, wherein the control device is configured to determine that the first contact state indicates that the first object is in contact with the second object while the first object is inclined to at least one of the plurality of fingers, in a case where at least one of values of the forces that act about each of the three axes and the moments that act about each of the three axes is larger than the threshold value.

7. A method of manufacturing an article, using a robot apparatus including a robot hand and configured to grip a first object with a plurality of fingers disposed on the robot hand and to bring the first object into contact with a second object, the robot apparatus comprising:
an opening/closing driving mechanism configured to drive the opening and closing of the plurality of fingers;
a force detection unit disposed on each of the plurality of fingers;
a position detection unit configured to detect a position of the plurality of fingers; and
a control device configured to control the robot hand, the method comprising:
bringing the first object into contact with the second object by using the robot hand, by the control device;
obtaining, by the control device, forces and moments that act about each of three axes when the first object is brought into contact with the second object based on the force detection unit and the position detection unit;
determining, by the control device, that the first object is brought into contact with the second object in a first contact state, moving the first object in a direction in which at least one of the values of the forces that act about each of the three axes and the moments that act about each of the three axes is smaller than or equal to a threshold value, and inserting the first object into the second object in a case where at least one of values of the forces that act about each of the three axes and the moments that act about each of the three axes is larger than the threshold value;
determining, by the control device, that the forces that act about each of the three axes and the moments that act about each of the three axes are generated by a friction between the first object and the second object, and inserting the first object into the second object in a case where the values of the forces that act about each of the three axes and the moments that act about each of the three axes are smaller than or equal to the threshold value; and
manufacturing an article by gripping the first object with the robot hand and inserting the first object into the second object.

8. A control method for a robot apparatus including a robot hand and configured to grip a first object with a plurality of fingers disposed on the robot hand and to bring the first object into contact with a second object and insert the first object into the second object,
the robot hand comprising:
an opening/closing driving mechanism configured to drive the opening and closing of the plurality of fingers;
a force detection unit disposed on each of the plurality of fingers; and
a position detection unit configured to detect a position of the plurality of fingers, the robot apparatus comprising:
a control device configured to control the robot hand, the control method comprising:
bringing the first object into contact with the second object by using the robot hand;
obtaining, by the control device, forces and moments that act about each of three axes when the first object is brought into contact with the second object, based on the force detection unit and the position detection unit;
determining, by the control device, that the first object is brought into contact with the second object in a first contact state, moving the first object in a direction in which at least one of the values of the forces that act about each of the three axes and the moments that act about each of the three axes is smaller than or equal to a threshold value, and inserting the first object into the second object in a case where at least one of values of the forces that act about each of the three axes and the moments that act about each of the three axes is larger than the threshold value;
determining, by the control device, that the forces that act about each of the three axes and the moments that act about each of the three axes are generated by a friction between the first object and the second object, and inserting the first object into the second object in a case where the values of the forces that act about each of the three axes and the moments that act about each of the three axes are smaller than or equal to the threshold value.

9. The control method according to claim 8, wherein the forces that act about each of the three axes and the moments that act about each of the three axes that are equal to the threshold value are values to be obtained when the first object is inserted into the second object while the first object is in contact with the second object in a second contact state.

10. The control method according to claim 9, further comprising predicting the direction in which at least one of the values of the forces that act about each of the three axes and the moments that act about each of the three axes is smaller than or equal to the threshold value based on the value of the moments that act about each of the three axes, by the control device.

11. The control method according to claim 9 wherein the second contact state is a state that the first object is in contact with the second object while the first object is substantially parallel with at least one of the plurality of fingers.

12. A non-transitory computer-readable recording medium storing a control program for executing the control method according to claim 8.

* * * * *